United States Patent
Makita

[11] Patent Number: 5,113,330
[45] Date of Patent: May 12, 1992

[54] AIMABLE HEADLAMP HAVING A DISCHARGE LAMP BULB AND A LIGHTING CIRCUIT THEREFOR

[75] Inventor: Hiroyuki Makita, Shimizu, Japan

[73] Assignee: Koito Manufacturing Co., Ltd., Tokyo, Japan

[21] Appl. No.: 700,272

[22] Filed: May 15, 1991

[30] Foreign Application Priority Data

May 18, 1990 [JP] Japan .................. 2-128337

[51] Int. Cl.$^5$ ............................ F21K 7/00
[52] U.S. Cl. ..................... 362/265; 362/61; 362/285; 362/419
[58] Field of Search ............ 362/61, 80, 263, 265, 362/285, 287, 418, 419, 427

[56] References Cited

U.S. PATENT DOCUMENTS

| | | | |
|---|---|---|---|
| 4,714,896 | 12/1987 | Wurster | 362/263 |
| 4,731,706 | 3/1988 | Ricard | 362/419 |
| 4,760,501 | 7/1988 | de Vrijer | 362/80 |
| 4,823,049 | 4/1989 | Sanders et al. | 313/623 |
| 4,845,598 | 7/1989 | Watanabe | 362/418 |
| 4,920,459 | 4/1990 | Rothwell, Jr. et al. | 362/61 |
| 5,016,155 | 5/1991 | Chevance | 362/418 |

Primary Examiner—Stephen F. Husar
Attorney, Agent, or Firm—Sughrue, Mion, Zinn, Macpeak & Seas

[57] ABSTRACT

An aimable vehicular headlamp system has a discharge lamp assembly mounted within a lamp housing via aiming screws. The discharge lamp assembly comprises a paraboloidal reflector, a discharge lamp bulb, and a bulb carrier subassembly electrically coupled to the discharge lamp bulb and mechanically supporting the same in position with respect to the reflector. Also included is a lighting circuit assembly comprising a ballast section for providing a high alternating voltage, and an igniter section electrically connected between the ballast section and the bulb carrier subassembly of the discharge lamp assembly for causing the lamp bulb to glow by an electric discharge. At leeast the igniter section of the lighting circuit is mounted to the lamp housing, with the igniter section electrically connected to the bulb carrier subassembly via flexible conductors of minimal lengths thoroughly disposed within the lamp housing.

6 Claims, 7 Drawing Sheets

AIMABLE HEADLAMP HAVING A DISCHARGE LAMP BULB AND A LIGHTING CIRCUIT THEREFOR

BACKGROUND OF THE INVENTION

This invention relates generally to vehicle headlamps and particularly to those employing discharge lamp bulbs as light sources. More particularly, the invention deals with a vehicle headlamp system having provisions for aiming a headlamp assembly, comprising a discharge lamp bulb and a reflector, both horizontally and vertically and retaining the same in the proper position with respect to a lamp housing. Still more particularly, the invention pertains to such an aimable vehicle headlamp system featuring improved electrical connection between the discharge lamp assembly and an electric lighting circuit assembly.

Discharge lamps, notably including metallic halide lamps, are finding ever increasing acceptance as light sources of vehicular headlamps. There has, however, been a problem left unsolved in use of discharge lamps for vehicular headlamp applications. The discharge lamp units of a headlamp system need electric lighting circuits including a voltage booster. Connected to the battery that is customarily mounted on the motor vehicle, the booster provides a high voltage required for each discharge lamp bulb to glow by an electric discharge between the pair of electrodes opposed to each other within the bulb.

Conventionally, the lighting circuits have been positioned away from the aimable discharge lamp assemblies. Elongate cables have been used for electrically connecting the lighting circuits to the lamp assemblies.

The present applicant objects to such conventional placement of the lighting circuits and to the use of the elongate cables that conduct currents at high voltages. While servicing the motor vehicle, the operator has been easy to be struck by electricity as the high voltage conductors and other parts of the circuits have been readily accessible. Moreover, the elongate cables have been very easy to produce electric noise. Such sources of noise production should be reduced to an absolute minimum, as today's vehicles, passenger cars in particular, are being furnished with an increasing number of electronic appliances.

For all these reasons there have been strong demands from the automobile industry for the advent of headlamp systems that employ discharge lamps with minimum lengths of high voltage supply cables.

SUMMARY OF THE INVENTION

The present invention aims at the drastic curtailment of cables or cords heretofore used for electrically connecting an aimable discharge lamp assembly and a lighting circuit assembly in a vehicle headlamp system of the type defined.

Briefly, the invention may be summarized as an aimable vehicle headlamp system comprising a lamp housing having an open end closed by a lens to define a lamp chamber therein. Disposed in this lamp chamber is a discharge lamp assembly comprising a reflector, a discharge lamp bulb subassembly including a discharge lamp bulb, and a bulb carrier subassembly which is coupled, both mechanically and electrically, to the discharge lamp bulb subassembly and which is mounted to the reflector for supporting the discharge lamp bulb subassembly in position with respect to the reflector. The complete discharge lamp assembly is mounted to the lamp housing via aiming means, typically comprising known aiming screws, whereby the discharge lamp assembly can be aimed and retained in position with respect to the lamp housing. The headlamp system further includes a lighting circuit assembly which comprises an electric lighting circuit and a circuit enclosure therefor. The lighting circuit comprises a ballast section for providing an alternating voltage, and an igniter section connected between the ballast section and the bulb carrier subassembly of the discharge lamp assembly for causing the discharge lamp bulb to glow by an electric discharge. Enveloping at least the igniter section of the lighting circuit, the circuit enclosure is mounted directly to the lamp housing. The igniter section is electrically connected to the bulb carrier subassembly, and thence to the discharge lamp bulb, via flexible electric conductor means which permit the aiming movement of the discharge lamp assembly relative to the lamp housing. The flexible conductor means can be wholly disposed within the lamp housing.

In one embodiment of the invention disclosed herein, the circuit enclosure encloses the complete lighting circuit and is mounted within the lamp housing. In another embodiment the circuit enclosure is mounted within a circuit housing which is separate from the lamp housing and which is fastened to the lamp housing.

Either way, no high voltage parts of the discharge lamp system are exposed outside the lamp housing according to this invention, so that there is no danger of the vehicle driver or servicemen inadvertently touching such high voltage parts. Additionally, the flexible conductor means can be of minimal length as the discharge lamp assembly and the lighting circuit assembly are positioned closer to each other than heretofore. Noise production from such short conductor means is negligibly small compared with that according to the prior art.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

General

Figure 1:
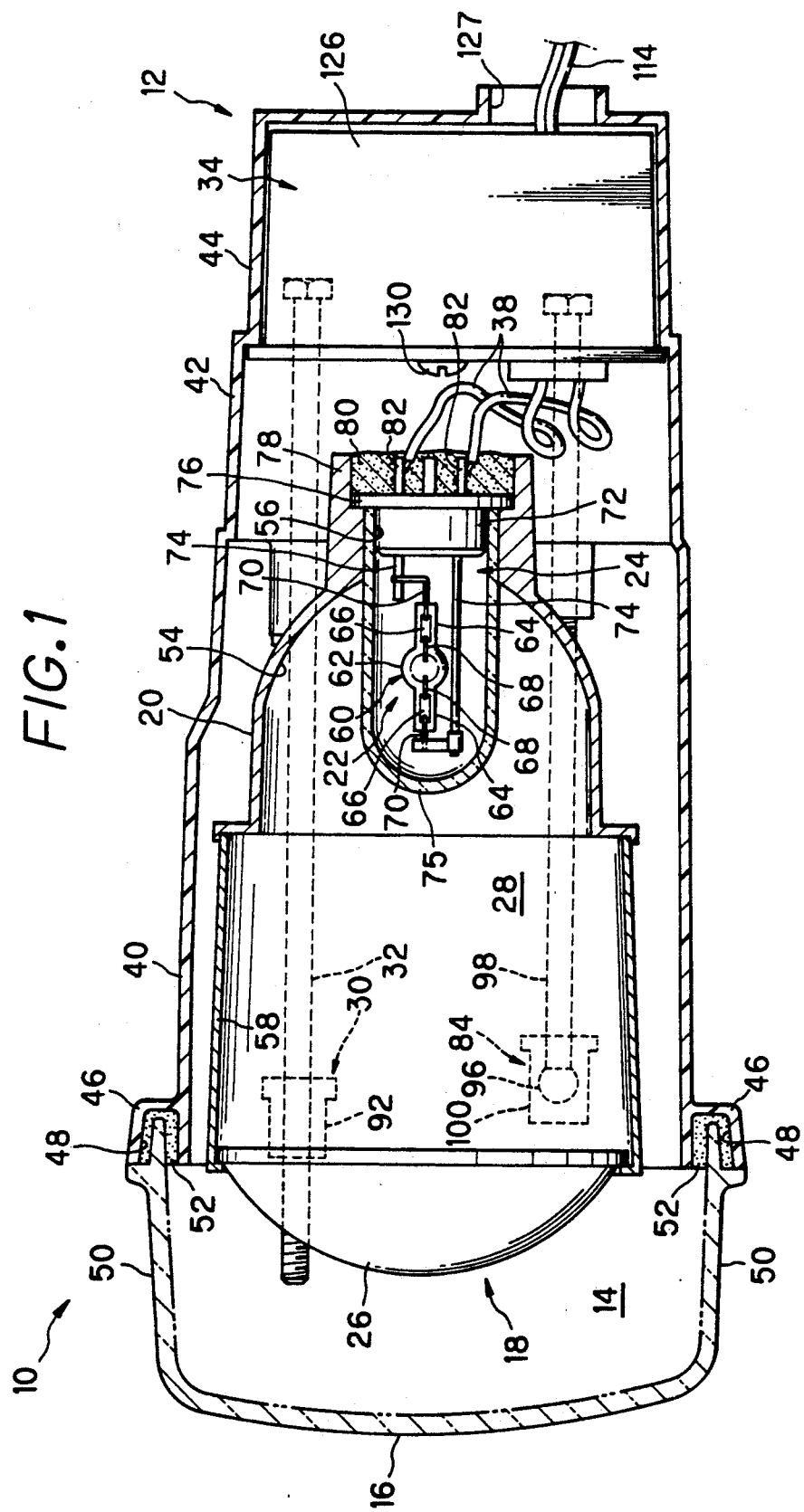
FIG. 1 is a vertical axial section through an aimable, single beam vehicle headlamp constructed in accordance with the novel concepts of this invention.

Reference is first directed to FIGS. 1–4 for a consideration of the general organization of the aimable headlamp system illustrated therein by way of a first preferable embodiment of this invention. Generally designated 10, the representative headlamp system includes a lamp housing 12 to be mounted fast to a motor vehicle which is not shown. The lamp housing 12 defines a lamp chamber 14 in combination with a cover lens 16.

Disposed in the lamp chamber 14 is a discharge lamp assembly 18 comprising a reflector 20, a discharge lamp bulb subassembly 22, and a bulb carrier subassembly 24. The reflector 20 has a projection lens 26 attached thereto and defines a lighting chamber 28, FIGS. 1 and 3, in combination therewith. The discharge lamp bulb subassembly 22 is disposed in the lighting chamber 28. The bulb carrier subassembly 24 functions to mechanically support the discharge lamp bulb subassembly 22 in position in the lighting chamber 28 and also to electrically connect the discharge lamp bulb subassembly to a lighting circuit to be set forth hereafter.

The complete discharge lamp assembly 18 is mounted to the lamp housing 12 via aiming means 30 comprising two aiming screws or bolts 32. These aiming screws are per se well known in the art and conventionally operate to permit the discharge lamp assembly 18 to be tilted both horizontally and vertically with respect to the lamp housing 12.

Another important component of the discharge lamp system 10 is a lighting circuit assembly 34. In this particular embodiment the lighting circuit assembly 34 is mounted within the lamp housing 12. The lighting circuit assembly 34 includes an electric lighting circuit 36, FIG. 5, which is configured as shown block diagrammatically in this figure. The lighting circuit 36 is electrically connected to the bulb carrier subassembly 24 and thence to the discharge lamp bulb subassembly 22 via sheathed flexible conductors 38 best revealed by FIGS. 1 and 3.

The following is a more detailed discussion of the above listed lamp housing 12, reflector 20, discharge lamp bulb subassembly 22, bulb carrier subassembly 24, aiming means 30, and lighting circuit assembly 34, in that order, which constitute the headlamp system 10 embodying the present invention. Such discussion will be divided under separate headings for the clarity of disclosure.

Lamp Housing

With reference to FIGS. 1–4 the lamp housing 12 is shown as a unitary molding of a plastic. Substantially tubular in shape, the lamp housing 12 is open at one end and closed at the other. The cover lens 16 closes the open end of the lamp housing 12 to define the lamp chamber 14. Both discharge lamp assembly 18 and lighting circuit assembly 34 are accommodated in the lamp chamber 14 in this particular embodiment.

Hereinafter in this specification, the directional terms such as "front" and "rear", "forward" and "rearward", and derivatives thereof will be used to refer to the front and to the rear, respectively, of the headlamp system 10 as viewed in FIGS. 1, 3 and 4. Thus, for example, the cover lens 16 is attached to the open front end of the lamp housing 12, and the lighting circuit assembly 34 is disposed at the rear end of the lamp chamber 14. Also, the directional terms such as "upper" and "lower", "top" and "bottom", "upward" and "downward", and derivatives thereof will be used in reference to the upward and downward direction, respectively, of the headlamp system as seen in FIGS. 1, 2 and 4.

Figure 2:
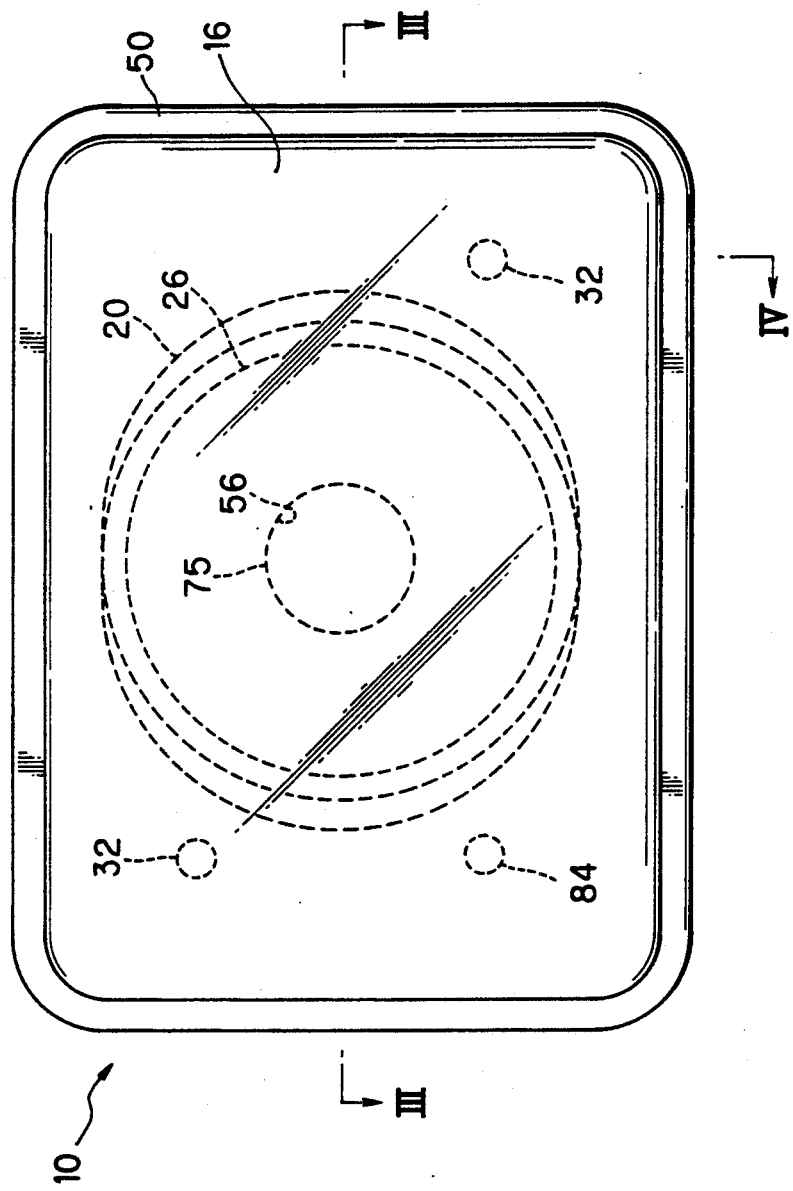
FIG. 2 is a front elevation of the headlamp of FIG. 1.
Figure 3:
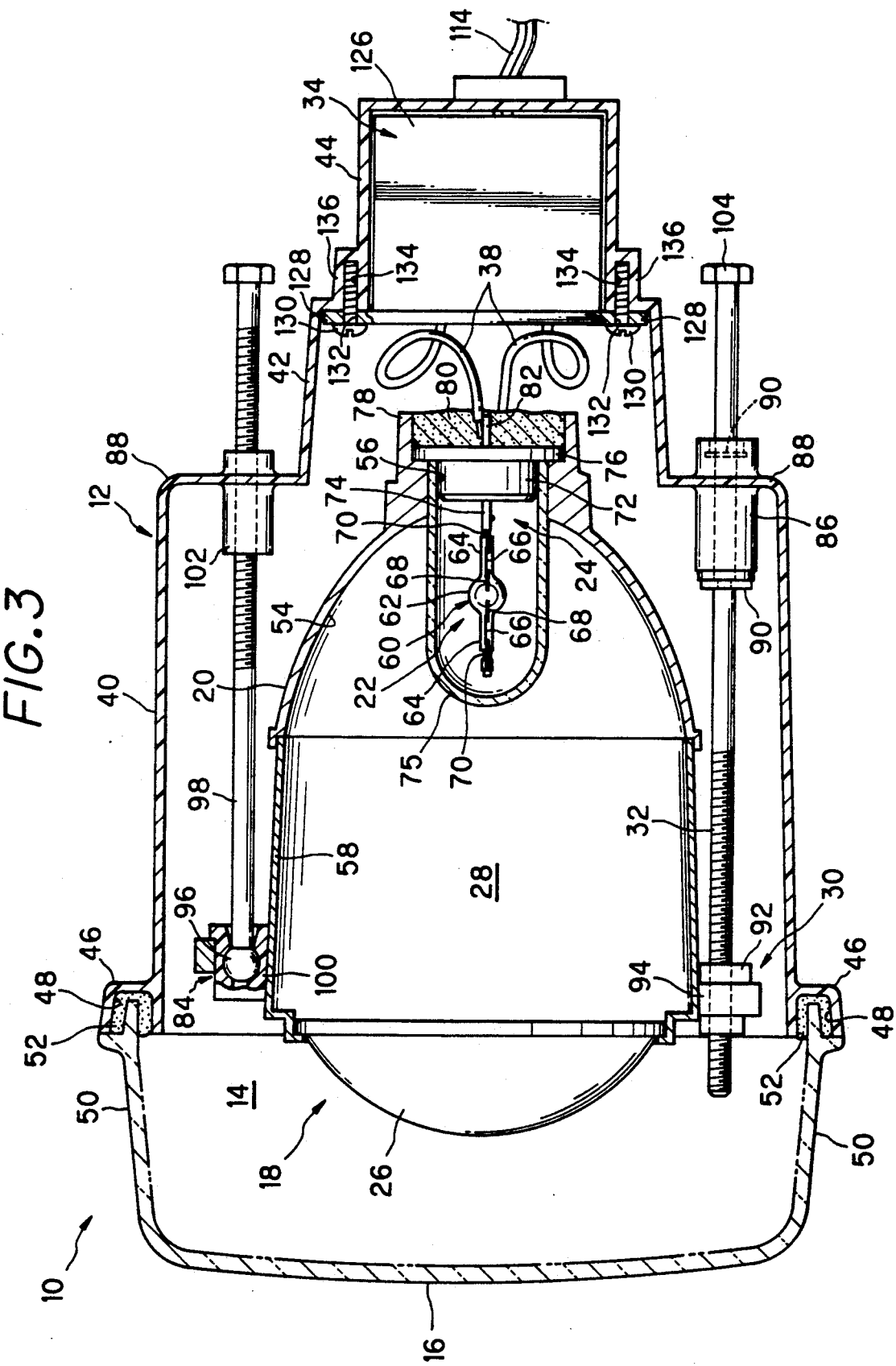
FIG. 3 is a horizontal section through the headlamp, taken along the line III—III in FIG. 2.
Figure 4:
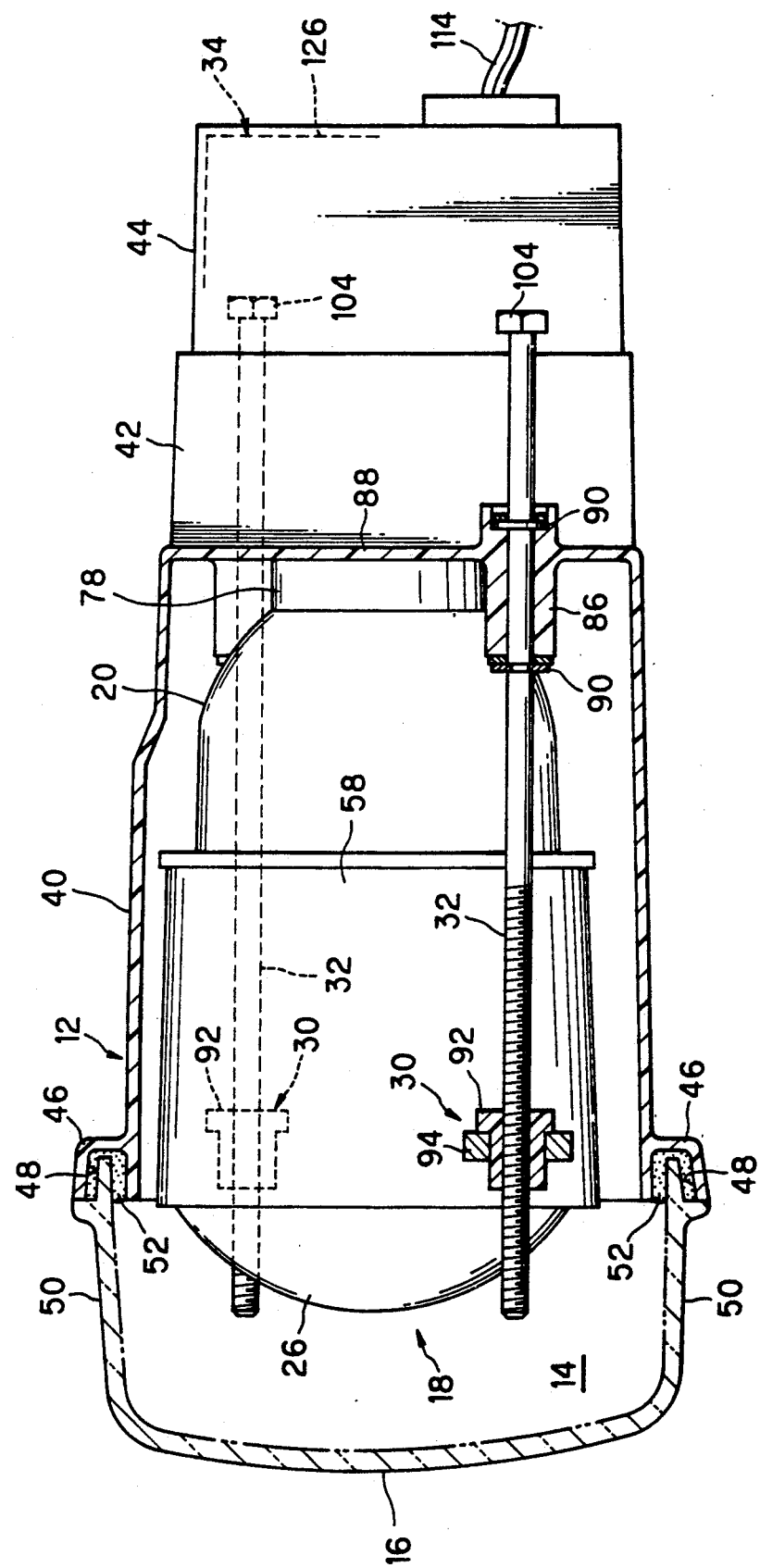
FIG. 4 is a vertical section through the headlamp, taken along the line IV—IV in FIG. 2.

As will be understood from FIGS. 1 and 3 in particular, the lamp housing 12 has a front section 40, a midsection 42 which is less in horizontal dimension than the front section, and a rear section 44 which is further less in both horizontal and vertical dimensions than the midsection. The front section 40 accommodates most of the discharge lamp assembly 18, and the rear section 44 accommodates the lighting circuit assembly 34.

The lamp housing 12 has an L shaped flange 46 extending all along its front edge. The flange 46 defines a forwardly open groove 48 of annular shape. The cover lens 16 has an annular rim 50 turned rearwardly from its periphery. The cover lens rim 50 is received with clearance in the lamp housing groove 48 and firmly retained therein by an adhesive 52 filled in the clearance.

Reflector

FIGS. 1 and 3 best illustrate the reflector 20 which constitute the discharge lamp assembly 18 in combination with the discharge lamp bulb subassembly 22 and the bulb carrier subassembly 24. The reflector 20 has a reflective surface 54 shaped like a paraboloid of revolution and directed forwardly. A mounting hole 56 is cut centrally in the reflector 20 for mounting the discharge lamp bulb subassembly 22 via the bulb carrier subassembly 24.

Extending forwardly from the reflector 20 is a tubular reflector extension 58 which is wholly disposed in the front section 40 of the lamp housing 12. The noted projection lens 26 is attached fast to the front end of this reflector extension 58.

Discharge Lamp Bulb Subassembly

Figure 5:
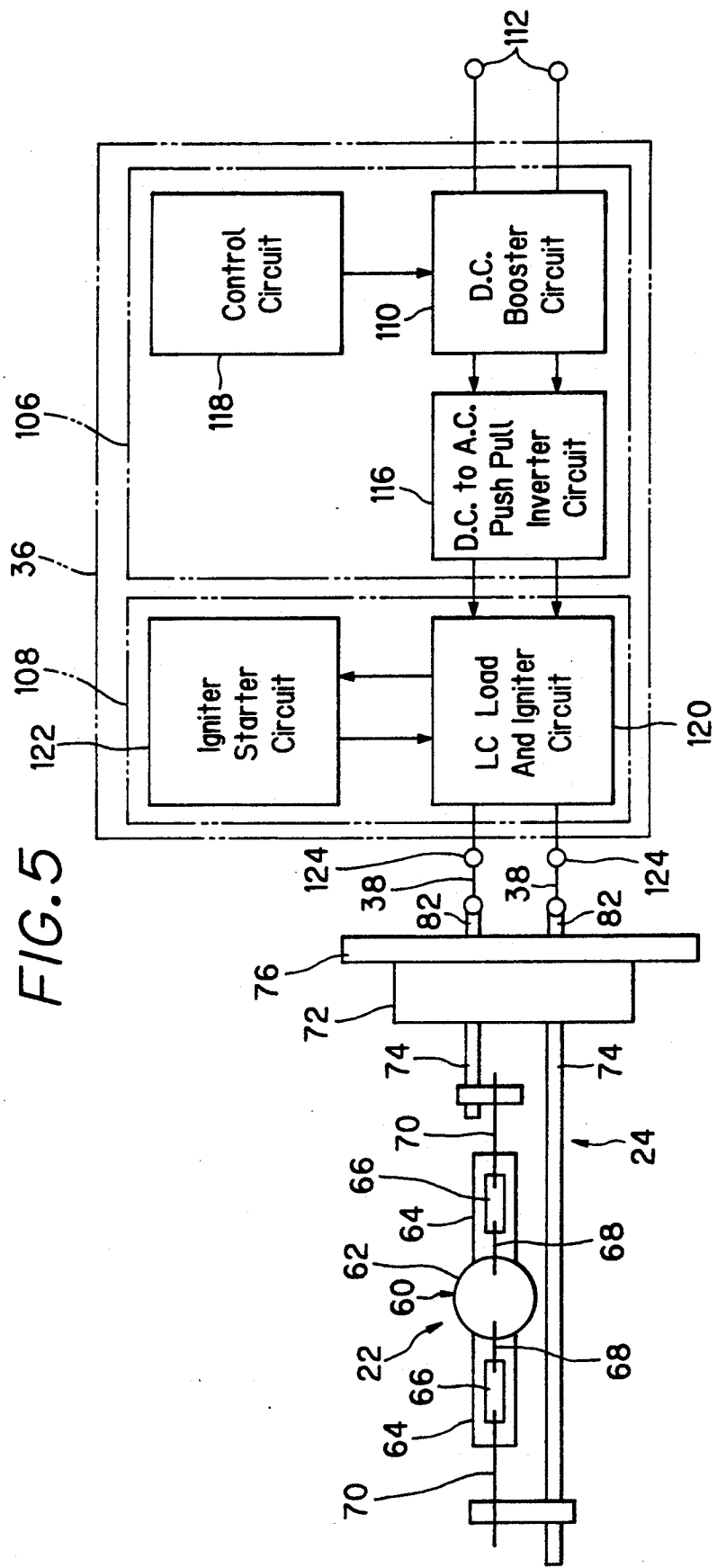
FIG. 5 is a block diagram of the lighting circuit for the discharge lamp bulb used in the headlamp, the lighting circuit being shown together with a schematic representation of the discharge lamp bulb and other means closely associated therewith.

The discharge lamp bulb subassembly 22, another component of the discharge lamp assembly 18, appears in FIGS. 1, 3 and 5. The discharge lamp bulb subassembly has a bulb or envelope 60 of vitreous material comprising a hollow body 62 in the shape of a prolate sphere with a pair of pinch seals 64 extending in opposite directions therefrom. The pinch seals 64 have a pair of metal foils 66 embedded therein. These metal foils are electrically connected one to each of a pair of rod shaped electrodes 68 which partly extend into the hollow body 62 of the envelope 60. The discharge lamp bulb is to glow by an electric discharge between the opposed ends of the electrodes 68. The metal foils 66 are connected to a pair of bulb leads 70 partly buried one in each pinch seal 64 and extending in opposite directions therefrom.

Bulb Carrier Subassembly

Reference may also be had to FIGS. 1, 3 and 5 for the following description of the bulb carrier subassembly 24 included in the discharge lamp assembly 18. The bulb carrier subassembly 24 has a carrier base 72 of cylindrical shape and electrically insulating material. Extending through the carrier base 72 in parallel spaced relation to each other are a pair of bulb support wires 74 which have portions of different lengths projecting forwardly from the carrier base. The front ends of these different length portions of the bulb support wires 74 are coupled to the pair of bulb leads 70 of the discharge lamp bulb subassembly 22.

Optionally, a transparent enclosure 75, herein shown shaped like a test tube, may be fitted over the carrier base 72 so as to envelope the discharge lamp bulb subassembly 22.

A consideration of FIGS. 1 and 3 will make clear how the bulb carrier subassembly 24, carrying the discharge lamp bulb subassembly 22 as above, is mounted to the reflector 20. The bulb carrier subassembly 24 with the discharge lamp bulb subassembly 24 and enclosure 75 thereon is inserted forwardly into and through the mounting hole 56 in the reflector 20 until a flange 76 on the carrier base 72 becomes snugly received in a sleeve 78 which is formed on the back of the reflector in one piece therewith. An adhesive 80 is filled in the space left by the carrier base flange 76 within the sleeve 78 against the possibility of accidental detachment of the bulb carrier subassembly 24 from the reflector 20. The noted pair of bulb support wires 74 have portions 82 projecting rearwardly from the carrier base 72 and extending through the adhesive 80 for electrical connection to the lighting circuit assembly 34.

Thus the bulb carrier subassembly 24 serves to mechanically support the discharge lamp bulb subassembly 22 in position with respect to the reflector 20. Additionally, the bulb carrier subassembly 24 functions to electrically connect the discharge lamp bulb subassembly 22 to the lighting circuit assembly 34 in a manner yet to be described.

It is believed to be clear from the foregoing how the reflector 20, discharge lamp bulb subassembly 22, bulb carrier subassembly 24 are constructed and put together to make up the discharge lamp assembly 18. The discharge lamp assembly 18 of this construction is mounted to the lamp housing 12 by means including the aiming means 30 which permit the discharge lamp assembly to be aimed, that is, tilted both horizontally and vertically, with respect to the lamp housing. The detailed description of the aiming means 30 follows.

Aiming Means

The primary components of the aiming means 30 are the two aiming screws 32 and a ball and socket joint 84. FIG. 1 clearly indicates the relative positions of the aiming screws 32 and the ball joint 84. The ball joint 84 is disposed adjacent one corner of the lamp housing 12. One of the aiming screws 32 is disposed in vertical register with the ball joint 84, and the other aiming screw in horizontal register with the ball joint.

As better illustrated in FIGS. 3 and 4, each aiming screw 32 rotatably extends through a boss 86 on a shoulder 88 of the lamp housing 12 between its front section 40 and midsection 42. A pair of collars 90 on each aiming screw 32 restrains the same against axial displacement relative to the lamp housing 12. Further each aiming screw 32 extends through, and is screw threadedly engaged, with a nut 92 immovably carried by a boss 94 on the extension 58 of the reflector 20.

With reference to FIG. 3 the ball joint 84 comprises a ball 96 formed on one end of a stud 98 and slidably engaged in a socket 100 on the reflector extension 58. The stud 98 extends through and is screw threadedly engaged with a nut 102 on the shoulder 88 of the lamp housing 12.

Thus, for aiming the discharge lamp assembly 18 with respect to the lamp housing 12, the heads 104 of the two aiming screws 32 may be turned in either a tightening or a loosening direction. The discharge lamp assembly 18 will then tilt about the horizontal and vertical axes extending through the ball joint 84.

Lighting Circuit Assembly

The construction of the lighting circuit assembly 34, as well as its connection to the discharge lamp bulb subassembly 22, will be better understood by first studying the electrical configuration of the lighting circuit 36 illustrated in FIG. 5. The lighting circuit 36 may be broadly envisaged as a combination of a ballast 106 and an igniter 108. The ballast 106 includes a d.c. booster circuit 110 having a pair of inputs 112. As will be understood by referring back to FIGS. 1, 3 and 4, these inputs 112 of the d.c. booster circuit 110 are to be connected via a cable 114 to a battery, not shown, that is customarily mounted on the motor vehicle.

Also included in the ballast 106 are a d.c. to a.c. push pull inverter circuit 116 and a control circuit 118. Connected to the output of the d.c. booster circuit 110, the inverter circuit 116 functions to translate the direct output voltage of the booster circuit into a sinusoidal voltage. The control circuit 118 is intended to control the output voltage of the booster circuit 110 as required by such parameters as the extinction time of the discharge lamp bulb subassembly 22.

The igniter 108 comprises an LC load and igniter circuit 120 and an igniter starter circuit 122. The LC load and igniter circuit 120 has its input connected to the d.c. to a.c. push pull inverter circuit 116. The igniter starter circuit 122 comprises means, not shown, for supplying a starting current to the igniter circuit 120 and for detecting the lamp current. The pair of output terminals 124 of the LC load and igniter circuit 120 are connected to the terminal portions 82 of the pair of bulb support wires 74 of the bulb carrier subassembly 24 via the noted pair of flexible conductors 38.

With reference back to FIGS. 1 and 3 the complete lighting circuit 36 of the foregoing enclosure is encased in a circuit enclosure 126 to make up the lighting circuit assembly 34. The lighting circuit assembly 34 is received in the rear section 44 of the lamp housing 12 in accordance with a feature of this invention. The power supply cable 114 for the lighting circuit 36 is led out of the lamp housing 12 through a hole 127, FIG. 1, in its rear wall.

As will be noted from FIG. 3, the circuit enclosure 126 is formed to include a pair of mounting flanges 128 extending laterally from its front end. Screws 130 extend through holes 132 in the mounting flanges 128 and are threadedly engaged in holes 134 in bosses 136 on the rear section 44 of the lamp housing 12. Thus is the lighting circuit assembly 34 secured to the lamp housing 12.

The vehicle headlamp system 10 of the foregoing construction according to the invention is conventional in operation. The present invention, as embodied in the headlamp system 10, features the fact that the lighting circuit subassembly 34 is mounted within the lamp housing 12 and electrically connected to the aimable discharge lamp assembly 18 via flexible cables 38 of minimum lengths. This novel configuration thoroughly defeats the inconveniences of high voltage current leakage and electrical noise production from elongate cables that have been conventionally employed in aimable headlamp systems of this type.

ALTERNATE EMBODIMENT

Figure 6:
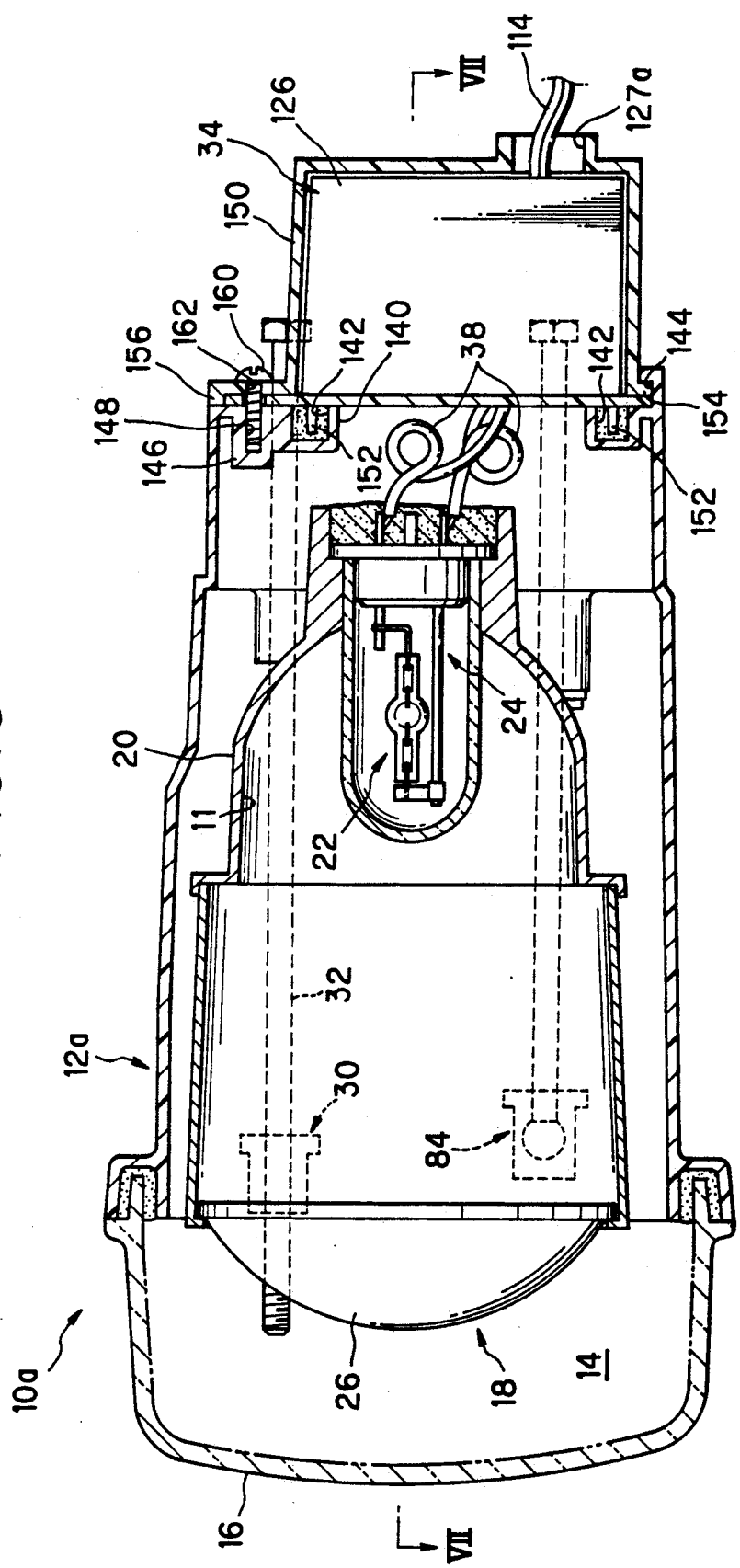
FIG. 6 is a view similar to FIG. 1 but showing an alternate embodiment of this invention.
Figure 7:
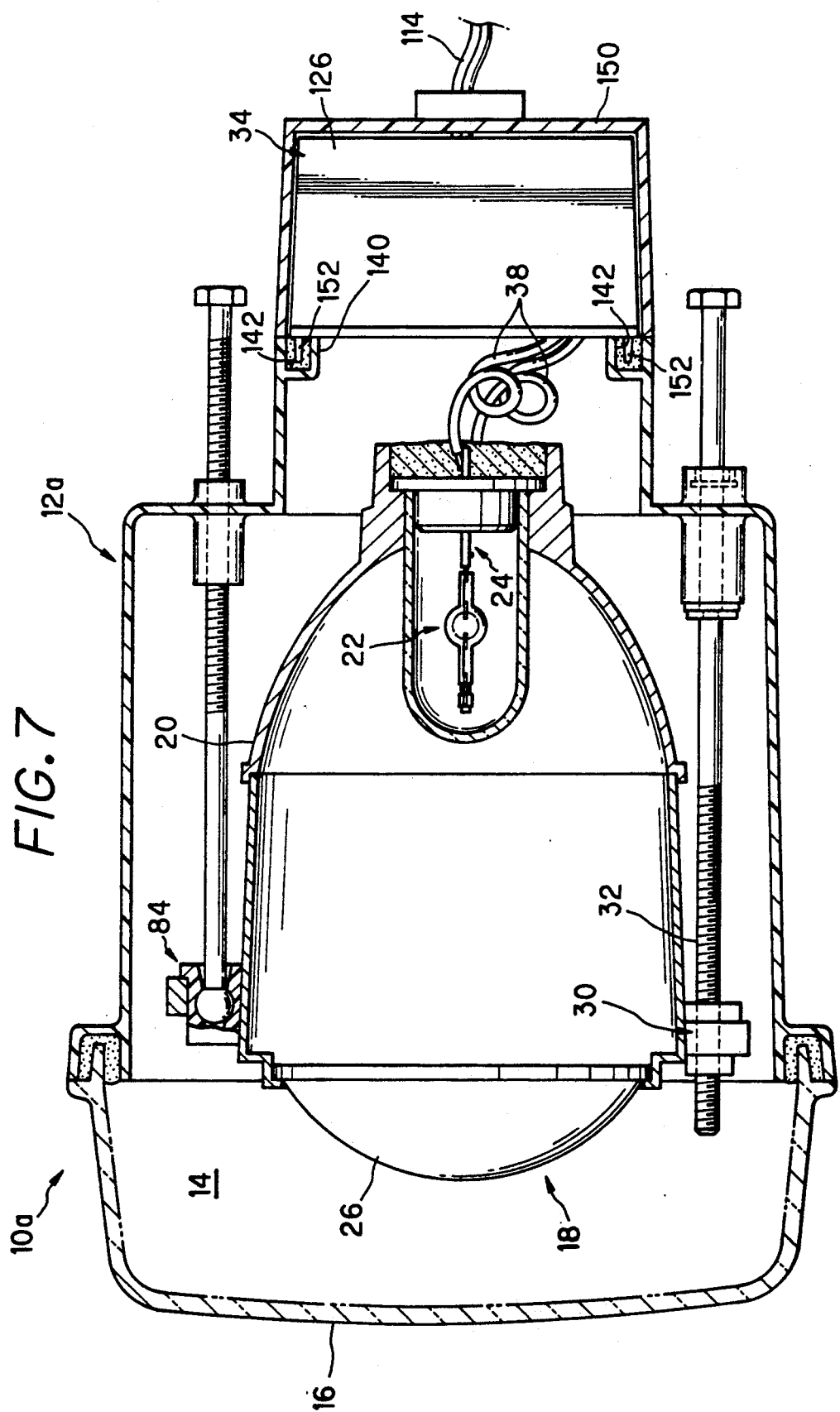
FIG. 7 is a horizontal section through the alternate headlamp, taken along the line VII—VII in FIG. 6.

FIGS. 6 and 7 illustrate an alternate aimable headlamp system 10a according to the present invention. This alternate headlamp system features a different method of mounting the lighting circuit assembly 34 to a lamp housing 12a which is slightly different in shape from the lamp housing 12 of the FIGS. 1-5 headlamp system 10.

The alternate headlamp system 10a is identical in the other details of construction with the headlamp system 10. Thus, in the lamp chamber 14 defined by the lamp housing 12a and cover lens 16, there is disposed the discharge lamp assembly 18 comprising the reflector 20, discharge lamp bulb subassembly 22, bulb carrier subassembly 24 and projection lens 26. The discharge lamp assembly 18 is aimably coupled to the lamp housing 12a via the aiming means 30 comprising the two aiming screws 32 and the ball and socket joint 84. No more detailed description of these components of the alternate headlamp system 10a is considered necessary.

The lamp housing 12a of this alternate embodiment differs from the lamp housing 12 of the first disclosed embodiment in having no section corresponding to the rear section 44 of the lamp housing 12 and, instead, in having an open rear end 140. This open rear end of the lamp housing 12a is surrounded by a set of rearwardly open grooves 142 of annular arrangement. Also, as seen in FIG. 6, the lamp housing 12a has an upwardly open groove 144 extending along the bottom edge of its rear end. A pair of bosses, one seen at 146 in FIG. 6, are formed adjacent the top of the rear end of the lamp housing 12a. Each boss 146 has a rearwardly open screw hole 148 formed therein.

As in the first disclosed headlamp system 10, the lighting circuit assembly 34 comprises the electric lighting circuit 36 of the FIG. 5 configuration encased in an enclosure 126. This enclosure in turn is received in a circuit housing 150 which forms a unit separate from the lamp housing 12a in accordance with a feature of the alternate headlamp system 10a. An opening 127a is formed in the rear wall of the circuit housing 150 for the passage of the supply cable 114 connecting the lighting circuit 36 to the unshown vehicle battery. The circuit housing 150 is mounted to the open rear end 140 of the lamp housing 12a in the following manner.

The circuit housing 150 has a set of tongues 152 of annular arrangement for engagement in the rearwardly open grooves 142 in the rear end of the lamp housing 12a. Also, extending along the front, bottom edge of the circuit housing 150, another tongue 154 is engaged in the upwardly open groove 144 in the rear end of the lamp housing 12a. The circuit housing 150 is positioned on the lamp housing 12a as the tongues 152 and 154 on the former are engaged in the grooves 142 and 144 in the latter.

Also, the circuit housing 150 has a pair of mounting lugs, one seen at 156 in FIG. 6, extending upwardly from its front, top edge. Screws 160 extend through holes 162 in the mounting lugs 156 and engaged in the holes 148 in the lamp housing bosses 146, thereby mounting the circuit housing 150 to the lamp housing 12a against the possibility of accidental detachment therefrom.

As in the preceding embodiment, the lighting circuit 36 of the lighting circuit assembly 34 can be electrically connected to the bulb carrier subassembly 24 via the flexible conductors 38 of minimum lengths. Thus the alternate headlamp system 10a gains the same advantages as set forth in connection with the headlamp system 10.

CONCLUSION

The two aimable headlamp systems 10 and 10a disclosed herein are meant purely to illustrate or explain and not to impose limitations upon the present invention. A variety of modifications or alterations of the illustrated embodiments will manifest themselves to one skilled in the art in order to conform to design preferences or to the requirements of each specific application of the invention. For example, only the igniter section 108 of the lighting circuit 36 could be mounted to the lamp housing 10 or 10a, and the ballast section 106 could be disposed in the vicinity of the lamp system 10 or 10a and electrically connected to the igniter section 108 via cables.

Also, since noise reduction is one of the primary objectives of this invention, it is recommended that the lighting circuit 36 be enclosed with noise shielding materials. More specifically, the enclosure 126 of the lighting circuit 36 may be metal made, or the lamp housing 12 or the circuit housing 150 may be coated with an electroconductive paint or molded from a plastic reinforced with electroconductive filaments.

All these and other modifications, alterations and adaptations of this invention are intended in the foregoing disclosure. It is therefore appropriate that the invention be construed broadly and in a manner consistent with the fair meaning or proper scope of the subjoined claims.

What is claimed is:

1. An aimable vehicle headlamp system comprising:
   (a) a lamp housing having an open end;
   (b) a lens closing the open end of the lamp housing and defining a lamp chamber in combination with the lamp housing;
   (c) a discharge lamp assembly disposed in the lamp chamber and comprising:
      (1) a reflector;
      (2) a discharge lamp bulb subassembly including a discharge lamp bulb; and
      (3) a bulb carrier subassembly coupled, both mechanically and electrically, to the discharge lamp bulb subassembly and mounted to the reflector for supporting the discharge lamp bulb subassembly in position with respect to the reflector;
   (d) aiming means for mounting the discharge lamp assembly to the lamp housing in order to aim and retain the discharge lamp assembly in position with respect to the lamp housing; and
   (e) a lighting circuit assembly comprising:
      (1) an electric lighting circuit comprising ballast means providing an alternating voltage, and igniter means for electrically connected between the ballast means and the bulb carrier subassembly of the discharge lamp assembly for causing the discharge lamp bulb to glow by an electric discharge; and
      (2) a circuit enclosure enclosing at least the igniter means of the electric lighting circuit and mounted to the lamp housing;
   (f) flexible electric conductor means connecting the igniter means of the lighting circuit of the lighting circuit assembly to the bulb carrier subassembly of the discharge lamp assembly, the flexible electric conductor means being wholly disposed within the lamp housing.

2. The aimable vehicle headlamp system of claim 1 wherein the circuit enclosure of the lighting circuit assembly, together with at least the igniter means of the electric lighting circuit enclosed therein, is mounted within the lamp housing.

3. The aimable vehicle headlamp system of claim 1 further comprising a circuit housing mounted to the lamp housing, the circuit enclosure of the lighting circuit assembly, together with at least the igniter means of the electric lighting circuit enclosed therein, being mounted within the circuit housing.

4. An aimable vehicle headlamp system comprising:
  (a) a lamp housing having an open front end and a rear end;
  (b) a cover lens closing the open end of the lamp housing and defining a lamp chamber in combination with the lamp housing;
  (c) a discharge lamp assembly disposed in the lamp chamber and comprising:
    (1) a reflector having an open front end and a rear end, the open front end of the reflector being oriented toward the cover lens;
    (2) a projection lens closing the open front end of the reflector and defining a lighting chamber in combination with the reflector;
    (3) a discharge lamp bulb subassembly including a discharge lamp bulb and disposed in the lighting chamber; and
    (4) a bulb carrier subassembly coupled, both mechanically and electrically, to the discharge lamp bulb subassembly and mounted to the rear end of the reflector for supporting the discharge lamp bulb subassembly in position in the lighting chamber;
  (d) aiming means for mounting the discharge lamp assembly to the lamp housing in order to aim and retain the discharge lamp assembly in position with respect to the lamp housing; and
  (e) a lighting circuit assembly comprising:
    (1) an electric lighting circuit comprising ballast means for providing an alternating voltage, and igniter means electrically connected between the ballast means and the bulb carrier subassembly of the discharge lamp assembly for causing the discharge lamp bulb to glow by an electric discharge; and
    (2) a circuit enclosure enclosing at least the igniter means of the electric lighting circuit and mounted to the rear end of the lamp housing;
  (f) flexible electric conductor means connecting the igniter means of the lighting circuit of the lighting circuit assembly to the bulb carrier subassembly of the discharge lamp assembly, the flexible electric conductor means being wholly disposed within the lamp housing.

5. The aimable vehicle headlamp system of claim 4 wherein the circuit enclosure of the lighting circuit assembly, together with at least the igniter means of the electric lighting circuit enclosed therein, is mounted within a rear end portion of the lamp housing.

6. The aimable vehicle headlamp system of claim 1 further comprising a circuit housing mounted to the rear end of the lamp housing, the circuit enclosure of the lighting circuit assembly, together with at least the igniter means of the electric lighting circuit enclosed therein, being mounted within the circuit housing.

* * * * *